United States Patent [19]

Musser

[11] 4,061,205
[45] Dec. 6, 1977

[54] CHECKOUT ASSEMBLY HAVING DUAL BAGGING STATION

[76] Inventor: Malcolm E. Musser, P.O. Box 386, Jackson Center, Ohio 45334

[21] Appl. No.: 741,380

[22] Filed: Nov. 12, 1976

[51] Int. Cl.$^2$ ...................... A47F 10/00; B65G 15/12; B65G 21/14
[52] U.S. Cl. .................................... 186/1 A; 198/538; 198/632
[58] Field of Search ............. 53/382; 186/1 A, 1 AC; 198/632, 816, 860, 538

[56] References Cited
U.S. PATENT DOCUMENTS

| 2,347,007 | 4/1944 | Tod | 198/632 X |
| 3,075,616 | 1/1963 | Shoffner | 186/1 A |
| 3,860,091 | 1/1975 | Chesnut | 186/1 A |
| 3,952,861 | 4/1976 | Holmqvist et al. | 198/816 |

FOREIGN PATENT DOCUMENTS 876,544  7/1971  Canada .................................. 186/1 A Primary Examiner—Stephen G. Kunin
Attorney, Agent, or Firm—Jacox & Meckstroth

[57] ABSTRACT

A supermarket type checkout assembly for bagging of articles of merchandise by a checkout clerk and/or for bagging by a person other than the checkout clerk. The checkout assembly is provided with two sections. One section is an article check counter for checking articles of merchandise by a checkout clerk. The other section is a bagging station member which includes an article support surface, a plurality of bag storage regions, and a plurality of bagging support shelves. The bagging station member also includes conveyor belt apparatus. The conveyor belt apparatus includes a stationary portion and an extension portion. The extension portion of the second conveyor belt apparatus is movable from an operative position between the article check counter and the bagging station member to a position adjacent the article support surface of the second section.

7 Claims, 7 Drawing Figures

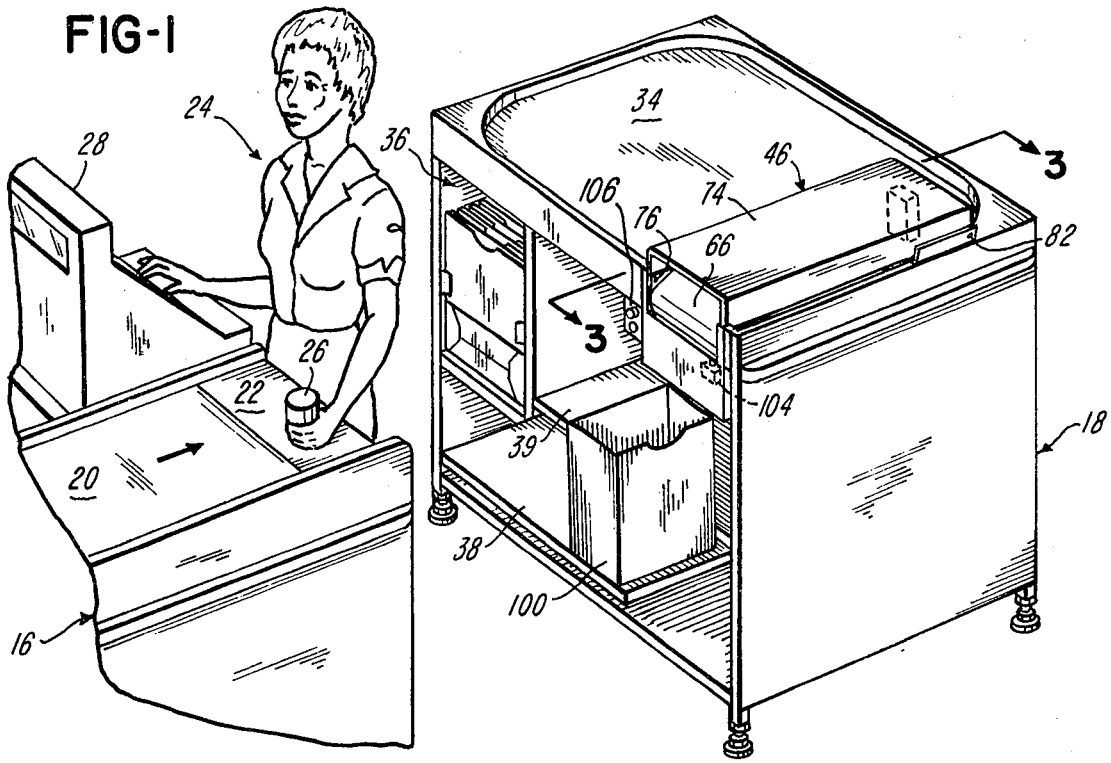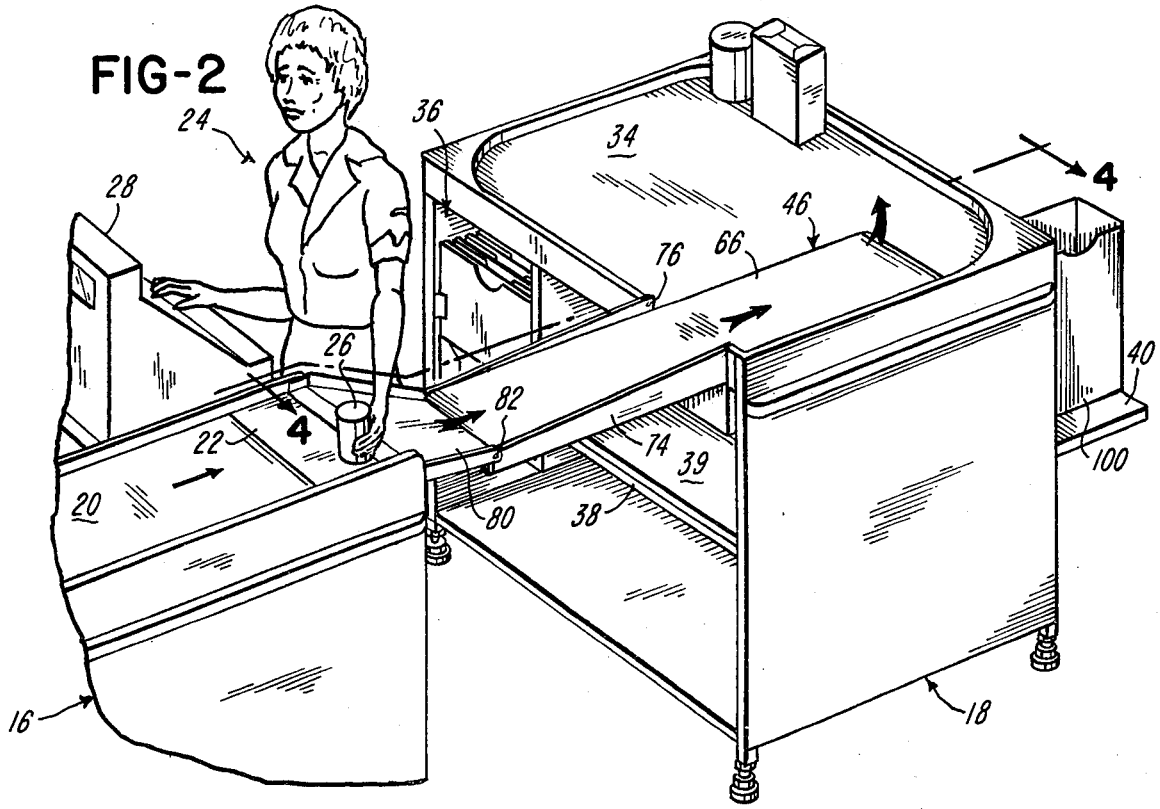

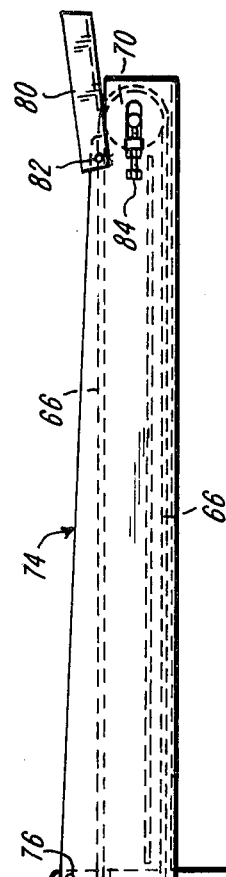
FIG-5
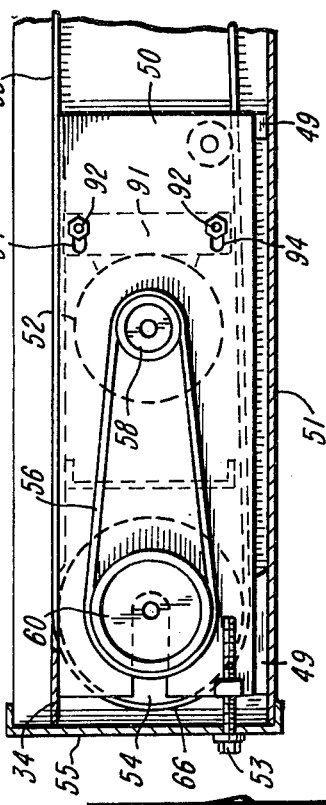
FIG-6
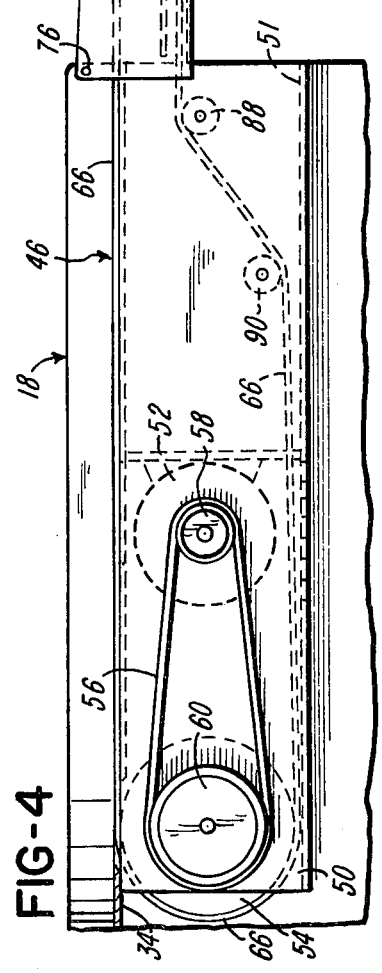
FIG-4
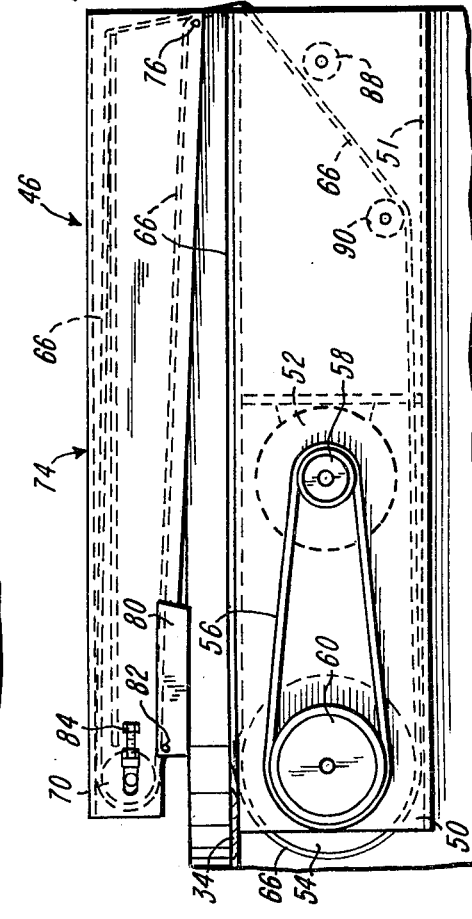
FIG-3
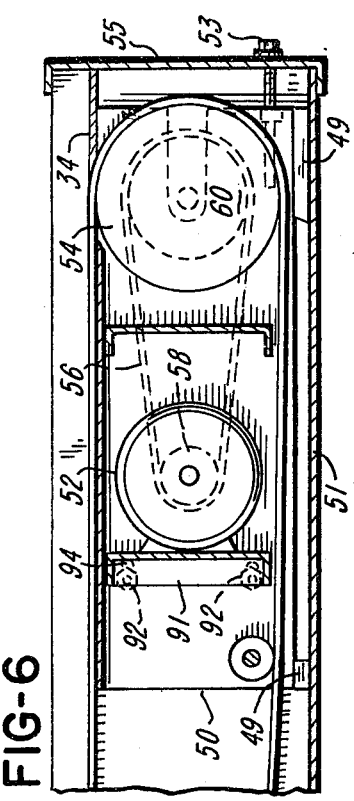
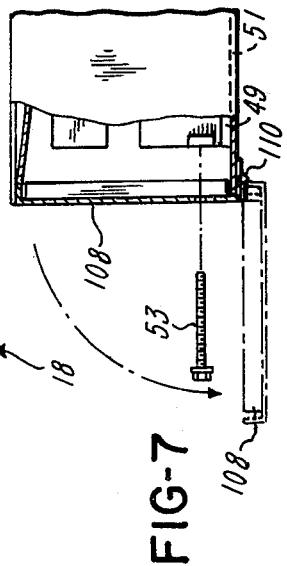
FIG-7

CHECKOUT ASSEMBLY HAVING DUAL BAGGING STATION

BACKGROUND OF THE INVENTION

In a supermarket type of retail sales establishment the volume of business is frequently such that it is desirable for a checkout clerk to devote all of his or her attention to checking the articles purchased by the customers while another person devotes his or her attention to bagging the articles purchased by customers. At other times, because of a reduced volume of business, it is desirable that a checkout clerk should bag the articles purchased by customers, as well as checking the articles.

In the past, a checkout stand has not been readily adaptable for bagging by either or both the checkout clerk and/or a bagging person other than a checkout clerk. Most known supermarket checkout assemblies have been designed so that bagging can be best performed by a person other than a checkout clerk. Some checkout assemblies have been designed so that bagging may also be performed by the checkout clerk, but much less efficiently or effectively.

It is an object of this invention to provide a checkout assembly which serves equally well as a unit for bagging by a checkout clerk or for bagging by a person other than the checkout clerk and which may serve simultaneously as a unit for bagging by both the checkout clerk and a person other than the checkout clerk.

Another object of this invention is to provide conveyor belt apparatus which has a portion which is readily movable between an extended position and a collapsed position.

Other objects and advantages of this invention reside in the construction of the parts thereof, the combination thereof, the method of manufacture, and the mode of operation, as will become more apparent from the following description.

ABSTRACT OF THE INVENTION

A supermarket checkout assembly of the type provided with a first section and a second section. The second section is a bagging station member which is spaced from the first section and which includes conveyor belt apparatus, the conveyor belt apparatus including a portion which is movable between an extended position adjacent the first section and a collapsed position adjacent the second section.

BRIEF DESCRIPTION OF THE VIEWS OF THE DRAWING

FIG. 1 is a perspective view of a checkout assembly of this invention, showing a portion of a first section thereof and a second section thereof. The conveyor belt apparatus of the second section is shown in a collapsed condition, so that the checkout assembly is in a condition for bagging by a checkout clerk.

FIG. 2 is a perspective view, similar to FIG. 1, but showing the conveyor belt apparatus of the second section in an extended condition, so that the checkout assembly is in a condition particularly for bagging by a person other than the checkout clerk.

FIG. 3 is a sectional view taken substantially on line 3—3 of FIG. 1.

FIG. 4 is a sectional view taken substantially on line 4—4 of FIG. 2.

FIG. 5 is a sectional view of a portion of the conveyor belt apparatus of FIGS. 3 and 4, but showing means for adjustment of tension in the conveyor belt and for adjustment of the tension in the drive belt.

FIG. 6 is a sectional view of the opposite side of the portion of the conveyor belt apparatus shown in FIG. 5.

FIG. 7 illustrates a modification in which a door is provided with a hinge which can be opened to permit removal of the carriage structure, drive motor and drive drums as a unit from a bagging station.

DETAILED DESCRIPTION OF THE INVENTION

A checkout assembly of this invention comprises a first section or article check counter 16 and a second section or article bagging station 18. The first section 16 is shown as including an endless conveyor belt 20 which has an upper surface which moves toward a stationary support member 22. The conveyor belt 20 is thus adapted to move articles of merchandise to the stationary support member 22. A checkout clerk 24 grasps or manually engages an article of merchandise 26 adjacent or upon the stationary support member 22 and notes the price thereof on a register 28.

The second section or article bagging station 18 of the checkout assembly is spaced from the first section or article check counter 16 and includes a main support surface 34, a bag supply compartment 36, a lower shelf 38, an intermediate shelf 39 and an auxiliary shelf 40. The lower shelf 38 is movable from an extended position shown in FIG. 1 to a retracted position shown in FIG. 2. The auxiliary shelf 40 is slidably movable from a position within the section 18 to an extension position shown in FIG. 2. The section 18 also includes a bag supply compartment adjacent the auxiliary shelf 40, but not shown herein.

The section 18 includes a conveyor belt unit 46 which has carriage structure 50 shown in FIGS. 3–6, below the main support surface 34. The carriage structure 50 is supported upon blocks 49 shown in FIGS. 5 and 6, which are attached to a floor 51. One or more adjustment bolts 53 threadedly engage the carriage structure 50 and an end wall 55. The carriage structure 50 supports a drive motor 52 and a drive drum 54. The drive drum 54 may, if desired, include a self contained gear unit, such as shown in U.S. Pat. No. 2,779,205. A drive belt 56 encompasses a pulley wheel 58 of the drive motor 52 and a pulley wheel 60 of the drive drum 54.

Encompassing the drive drum 54 is a conveyor belt 66 which has an upper portion adjacent the drive drum 54 which is substantially in the plane of the main surface 34 of the section 18. The conveyor belt 66 also encompasses an idler roller 70 shown in FIGS. 3 and 4, which is rotatably supported by an arm 74. The arm 74 is pivotally attached to the section 18 by pins 76. In FIG. 2 the arm 74 is shown extending from the section 18 to a position slightly spaced from the section 16. A chute 80 is pivotally attached by pins 82 to the end of the arm 74 and, as shown in FIG. 2, is positionable adjacent the stationary support member 22 of the section 16.

The position of the idler roller 70 for adjustment of the tension in the conveyor belt 66 is adjustable by means of adjustment screws 84, shown in FIGS. 3 and 4.

The lower portion of the belt 66 between the roller 70 and the drive drum 54 also engages idler rollers 88 and 90 which are within the section 18.

The arm 74, with the portion of the conveyor belt 66 carried thereby, is pivotal from the position thereof shown in FIG. 2 to the position thereof shown in FIGS. 1 and 3, in which the arm 74 and the portion of the conveyor belt 66 carried thereby is above the portion of the belt 66 which is adjacent the drive drum 54. The belt 66 is thus, in effect, folded, as illustrated in FIG. 3.

The position of the carriage structure 50 with respect to the section 18 is readily adjustable by means of the adjustment bolts 53. The carriage structure 50, with the drive motor 52 and the drive drum 54, as a unit, can be easily removed from the section 18, if desired, for repair of a part thereof, or for replacement thereof.

FIG. 7 illustrates a modification in which a door 108 is provided with a hinge 110 which can be opened to permit removal of the carriage structure 50, with the drive motor 52 and the drive drum 54, as a unit from the section 18. Prior to opening of the door, each adjustment bolt 53 is removed, as illustrated.

A bracket 91 within the carriage structure 50 supports the drive motor 52. The bracket 91 is adjustable with respect to the carriage structure 50, as the bracket 91 is clamped to the carriage structure 50 by clamping screws 92 which fit into adjustment slots 94 of the bracket 91, as shown in FIG. 5. Thus, the drive motor 52 is adjustable with respect to the drive drum 54 for adjusting the tension in the drive belt 56.

When the arm 74, with the portion of the conveyor belt 66 carried thereby, is positioned in the manner illustrated in FIG. 1, the checkout clerk 24 receives articles of merchandise at the stationary support member 22 or adjacent thereto, from the conveyor belt 20. The checkout clerk 24 then places the articles, such as the article 26, into a bag 100 which is positioned upon the shelf 38 within the section 18. Thus, the checkout clerk 24 can readily check articles of merchandise and also bag the articles of merchandise.

If conditions exist in which a person, other than or in addition to the checkout clerk, is to bag articles of merchandise, the arm 74, the portion of the conveyor belt 66 carried thereby, and the chute 80 are moved to the position thereof shown in FIG. 2. A switch 104, shown in FIG. 1, operably engageable by the arm 74, may be used to automatically de-energize the drive motor 52 when the arm 74 is positioned as shown in FIG. 1. When the arm 74 is positioned as shown in FIG. 2, the switch 104 is closed. A control switch 106 is used by the checkout clerk 24 to stop or start the drive motor 52 when the arm 74 is in the extended position shown in FIG. 2.

The conveyor belt 66 is thus rotatively operated to move articles of merchandise. The articles are moved by the checkout clerk 24 from the stationary support member 22 to the chute 80. The articles move downwardly upon the chute 80 to the conveyor belt 66. The articles move upon the belt 66 to the main support surface 34 of the section 18. A person standing adjacent the auxiliary shelf 40 of the section 18 then removes the articles from the main support surface 34 and places the articles into a bag 100 positioned upon the auxiliary shelf 40.

As a drive unit for the conveyor belt 20 of the section 16, a drive unit such as that employed in the section 18 may be used. Carriage structure, such as the carriage structure 50, with the drive motor 52 and the drive drum 54, may be used as a drive unit for operation of the conveyor belt 20 of the section 16.

Thus, it is understood that the checkout assembly of this invention provides two stations for bagging of articles of merchandise which are checked out by a checkout clerk.

Although the preferred embodiment of the checkout assembly of this invention has been described, it will be understood that within the purview of this invention various changes may be made in the form, details, proportion and arrangement of parts, the combination thereof, and the mode of operation, which generally stated consist in a checkout assembly within the scope of the appended claims.

The invention having thus been described, the following is claimed:

1. Conveyor apparatus adapted for use with a checkout assembly, comprising:
an endless rotatable conveyor member, the endless rotatable conveyor member having a first portion and a second portion, fixed support means rotatably supporting the first portion of the endless rotatable conveyor member, movable support means supporting the second portion of the endless rotatable conveyor member, the movable support means being movable to an active position in which the second portion of the endless rotatable conveyor member is in substantially the same plane as the first portion thereof, the movable support means being movable to an inactive position in which the second portion of the endless rotatable conveyor member is at an angle with respect to the first portion thereof.

2. In a checkout stand comprising:
an endless conveyor belt provided with a first portion and a second portion, drive mechanism operably joined to the endless conveyor belt for rotation thereof, stationary means supporting the first portion of the endless conveyor belt, carrier means supporting the second portion of the endless conveyor belt in an operating position which extends substantially linearly from the first portion thereof, said carrier means being pivotally movable to position the second portion of the endless conveyor belt in an inoperative position at an angle with respect to the first portion thereof.

3. A checkout stand of the type provided with an article check counter, the improvement comprising:
a bagging station member in spaced relationship from the article check counter, including a main receiver surface, drive mechanism, an endless conveyor belt operably joined to the drive mechanism for operation thereby, the endless conveyor belt having a first portion substantially in the plane of the main receiver surface and adjacent thereto, the endless conveyor belt also having a second portion, an arm having a pivot portion pivotally supported adjacent the main receiver surface, the pivot portion dividing the first portion of the endless conveyor belt from the second portion thereof, the arm having an end portion spaced from said pivot portion, a roller rotatably carried by said end portion of the arm, the second portion of the endless conveyor belt encompassing the roller and extending along said arm, the arm being pivotally movable to an active position extended from the main receiver surface and adjacent the article check counter, in such position the second portion of the endless conveyor belt being adjacent the article check counter for transfer of articles from the check counter to the second portion of the endless conveyor belt, the arm being pivotally movable to an inactive position in which the conveyor belt is folded and the second portion of the endless conveyor belt is positioned above said first portion of the endless conveyor belt.

4. A checkout stand of the type provided with an article check counter, the improvement comprising:

a bagging station member in spaced relationship from the article check counter and provided with a main receiver surface, conveyor belt mechanism supported by the bagging station member and including a continuous conveyor belt having a first portion fixed substantially in the plane of the main receiver surface, the first portion of the continuous conveyor belt also being fixed in a position contiguous with the main receiver surface, the continuous conveyor belt having a second portion, an arm pivotally attached to the bagging station member, the arm including means rotatably supporting the second portion of the continuous conveyor belt, the arm having an end portion, the arm having a first pivotal position in which the arm extends horizontally from the bagging station and in which the end portion of the arm is adjacent the article check counter for transfer of articles from the article check counter to the second portion of the continuous conveyor belt, the arm having a second pivotal position in which the arm and the second portion of the continuous conveyor belt supported thereby are above the first portion of the continuous conveyor belt, the continuous conveyor belt thus being folded when the arm is in its second pivotal position.

5. A checkout assembly comprising:

a check counter, a bagging station member in spaced relationship from the check counter, the check counter including an article support member, the bagging station member including a main support surface, a conveyor belt unit adjacent the main support surface, the conveyor belt unit including drive mechanism adjacent the main support surface, the conveyor belt unit also including support means movable with respect to the main support surface, an endless conveyor belt, the endless conveyor belt having a first portion substantially in the plane of the main support surface and adjacent thereto, the endless conveyor belt also having a second portion, the second portion being supported by the support means, means operably joining the endless conveyor belt to the drive mechanism, means supporting the support means for movement between a position adjacent the check counter and a position adjacent the main support surface of the bagging station member, the second portion of the endless conveyor belt thus being movable by the support means to a position adjacent the check counter for transfer of articles from the check counter to the second portion of the endless conveyor belt, the second portion of the endless conveyor belt also being movable by the support means to a position adjacent the main support surface of the bagging station.

6. In a checkout assembly, a bagging station unit comprising:

support means, carriage structure supported by the support means, a drive drum rotatably carried by the carriage structure, a drive motor carried by the carriage structure, drive means joining the drive motor to the drive drum for rotation thereof, an arm member pivotally attached to the support means, a roller rotatably supported by the arm member, an endless conveyor belt encompassing the drive drum and the roller, the endless conveyor belt having a first portion carried by the drive drum, the endless conveyor belt having a second portion carried by the roller which is supported by the support arm member, the arm member being pivotally movable to a position extending from the support means to position the second portion of the conveyor belt at a position extending from the support means, the arm member being pivotally movable to a position adjacent the support means to position the second portion of the conveyor belt adjacent the support means.

7. The checkout assembly of claim 6 in which the carriage structure is removably supported by the support means, and in which a door is attached to the support means adjacent the carriage structure for access to the carriage structure for removal thereof from the support means.

* * * * *